United States Patent [19]

McGhie et al.

[11] Patent Number: 5,005,851
[45] Date of Patent: Apr. 9, 1991

[54] TRUCK MOUNTED JEEP HAVING ADJUSTABLE AXLE AND LOADING CAPACITY

[76] Inventors: James R. McGhie, 4632 Metcalf Dr., Eagan, Minn. 55122; Robert Dieleman, 6109 S. Industrial Rd., Las Vegas, Nev. 90118

[21] Appl. No.: 491,939

[22] Filed: Mar. 12, 1990

[51] Int. Cl.5 .................. B60D 1/44; B62D 53/00; B62D 53/06
[52] U.S. Cl. .................. 280/407.1; 280/411.1; 280/441
[58] Field of Search ............... 280/433, 405.1, 407.1, 280/430, 441, 404, 406.1, 407, 411.1, 438.1, 656; 180/209

[56] References Cited

U.S. PATENT DOCUMENTS

| | | | |
|---|---|---|---|
| 2,741,489 | 4/1956 | Bigge | 280/407.1 X |
| 3,021,155 | 2/1962 | Sherman | 280/438.1 X |
| 3,393,758 | 7/1968 | Helm et al. | |
| 3,467,408 | 9/1969 | Regalia | 280/656 |
| 3,767,071 | 10/1973 | Harbers | 280/404 X |
| 3,903,979 | 9/1975 | Perrotin | |
| 4,070,033 | 1/1978 | Weir et al. | 280/407 X |
| 4,262,923 | 4/1981 | Weir | 280/404 X |
| 4,335,898 | 6/1982 | Orosz et al. | 280/407.1 X |
| 4,453,734 | 6/1984 | McGhie et al. | |
| 4,460,194 | 7/1984 | McGhie et al. | |
| 4,468,047 | 8/1984 | McGhie et al. | |
| 4,741,549 | 5/1988 | Gevers | 280/407.1 |
| 4,762,192 | 8/1988 | Maxwell | 280/404 X |

Primary Examiner—Charles A. Marmor
Assistant Examiner—Kevin Hurley
Attorney, Agent, or Firm—Paul L. Sjoquist

[57] ABSTRACT

A jeep for use with a vehicle for carrying heavy loads on conventional roadways. The jeep is supported by many independent wheel/axle units mounted for transverse movement relative to the jeep. A fifth wheel movable in two orientations, vertical and longitudinal, is provided for coupling a load to the jeep.

7 Claims, 6 Drawing Sheets

TRUCK MOUNTED JEEP HAVING ADJUSTABLE AXLE AND LOADING CAPACITY

BACKGROUND OF THE INVENTION

This invention relates generally to heavy duty transport vehicles for carrying loads on conventional roadways and, more specifically, to a heavy load hauling vehicle for moving medium to massive loads such as heavy equipment or the like which includes a front, tractor-drawn carriage or jeep, a rear carriage or jeep and a load unit disposed between and supported by the carriages.

Multi-axle, semitrailer-type transport vehicles are known in the prior art and are well represented by the following U.S. Pat. Nos.: 2,819,911; 3,903,979; 3,968,495; 3,689,107; 3,690,698; 3,734,538; 3,930,669; and 4,165,005. The transport vehicle of the present invention is directed to providing adjustable or variable loading on components of the vehicle and to carrying substantially heavier loads than the vehicles disclosed in these patents.

There are numerous patents disclosing improvements to trailer-type transport vehicles and components thereof. Stabilizing or adjustable fifth-wheel hitches are known and generally provide sway or tilt features or mechanisms for accommodating relative motion between a towing vehicle and a trailing vehicle. Representative patents include U.S. Pat. Nos. 3,122,382; 3,309,111; 4,199,168; and 4,444,408. Once again, however, the improvements disclosed in these patents are directed to working with substantially lighter loads than is the present invention; variable or adjustable loading of overall vehicle components is not addressed.

Vehicles for carrying very heavy loads and components therefore are disclosed in U.S. Pat. Nos. 4,453,734; 4,460,194; 4,468,048; 3,438,652 and 3,439,630. These patents disclose various suspension systems for wheel/axle units or articulated two-part carriages. Controllable steering for trailer-type vehicles for hauling heavy loads is disclosed in U.S. Pat. No. 4,468,047 and fifth-wheel couplings are also disclosed. U.S. Pat. No. 3,393,758 discloses a mechanism for widening the distance between crawler frames of a crawler-type vehicle.

Despite the advancements and improvements in the art concerning heavy duty transport vehicles, there still are some significant problems, particularly when intended payloads approach the one million pound level. These difficulties include: achieving optimum distribution of the load evenly among the wheels; achieving a soft ride so that the extremely heavy rolling loads do not damage the road surfaces, the load or the vehicle itself; achieving a stiff ride in a direction transverse to the travel direction so as to give optimum stability to the traveling load; and, conforming to different standards of weight bearing and weight distribution for vehicles making use of roadways under the various jurisdictions that might be encountered during a long distance trip.

The co-inventor of the present invention, James McGhie, is the inventor or co-inventor of a number of the above cited patents. He is also the co-inventor of pending U.S. Pat. Application Ser. No. 187,557, filed Apr. 28, 1988. That application is directed to providing a heavy load hauler having hydraulically suspended, steerable, independent wheel and axle units in an attempt to address some of the previously noted difficulties in transporting heavy loads. The present invention is directed to further improvements to heavy duty transport vehicles for transporting medium to massive loads.

SUMMARY OF THE INVENTION

A carriage or jeep for use with a heavy duty transport vehicle for carrying medium to massive loads on conventional roadways is provided. The vehicle includes at least one tractor, a front tractor-drawn jeep, a rear carriage and a load unit disposed therebetween. The carriage and jeep are supported by many independent wheel and axle units. At least some of the independent wheel and axle units are mounted for transverse spreadable and retractable movement relative to the jeep The front jeep has two fifth-wheel coupling points; near the leading end of the front jeep is a fifth-wheel coupling point for connecting the jeep to the tractor and there is a second fifth-wheel coupling spaced rearwardly from the first. The rear carriage has a fifth-wheel coupling medially located between the leading and trailing ends of the carriage. The fifth wheel supported by the jeep is adjustable in two orientations, vertically relative the surface of the jeep and horizontally along the longitudinal axis of the jeep A typical load unit has forwardly and rearwardly projecting goosenecks for attaching to the respective fifth-wheel couplers on the front jeep and rear carriage.

One of the objects of the present invention is to provide a load transport vehicle that enables the adjustable distribution of a load carried thereby among the front wheel/axle systems supporting the load.

Another object of the present invention is to provide a heavy duty transport vehicle for moving loads whereby the distribution of loading on the front jeep can be adjusted by sliding the jeep fifth wheel to reach the desired distribution between the tractor and jeep.

Another object of the present invention is to provide a heavy duty transport vehicle for moving loads that has a soft ride in the direction of travel and which has a stiff ride in the direction transverse to the direction of travel so as to provide maximum stability for the traveling load.

Yet another object of the present invention is to provide a transport vehicle for loads wherein after the vehicle is loaded, the load may be selectively positioned vertically with respect to the ground, thus allowing the raising and lowering of the load.

An additional object of the present invention is to provide a heavy duty transport vehicle for carrying loads on conventional roadways that provides for the adjustable or variable distribution of load evenly among the multiple-wheel and axle units supporting the vehicle in order to comply with various regulatory agencies requirements regarding weight limitations and distributions.

A feature of the present invention is that the adjustment or positioning of vehicle components is actuated by hydraulic jacks or piston and cylinder arrangements.

Further objects, features and advantages of the present invention will be understood with reference to the following specification and to the appended drawings and claims.

DETAILED DESCRIPTION OF THE PRESENT INVENTION

Figure 1:
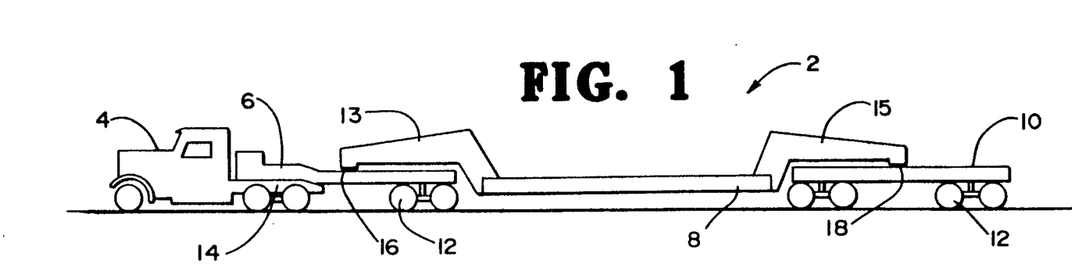
FIG. 1 is a largely schematic depiction of a vehicle including the jeep of the present invention.

FIG. 1 provides an illustration, partially schematic, of the entire vehicle 2 of the type with which the present invention may be used. The vehicle provides a modular, flexible assembly which is easily adaptable to virtually any on or off highway load hauling requirement. Overall vehicle length may reach and exceed 130 feet. The vehicle 2 comprises a tractor 4, a front jeep 6, a load unit 8, and a rear carriage 10. Both jeep 6 and carriage 10 are supported by a plurality of wheel/axle assemblies 12. The load unit 8 is supported by and connected to the jeep 6 and carriage 10 by front and rear goosenecks 13, 15. A fifth-wheel connection 14 is provided for connecting the jeep 6 to tractor 4. Goosenecks 13 is attached to the jeep 6 at front fifth-wheel hitch 16. The other gooseneck 15, is attached to the rear carriage 10 at rear fifth-wheel hitch 18.

Figure 2:
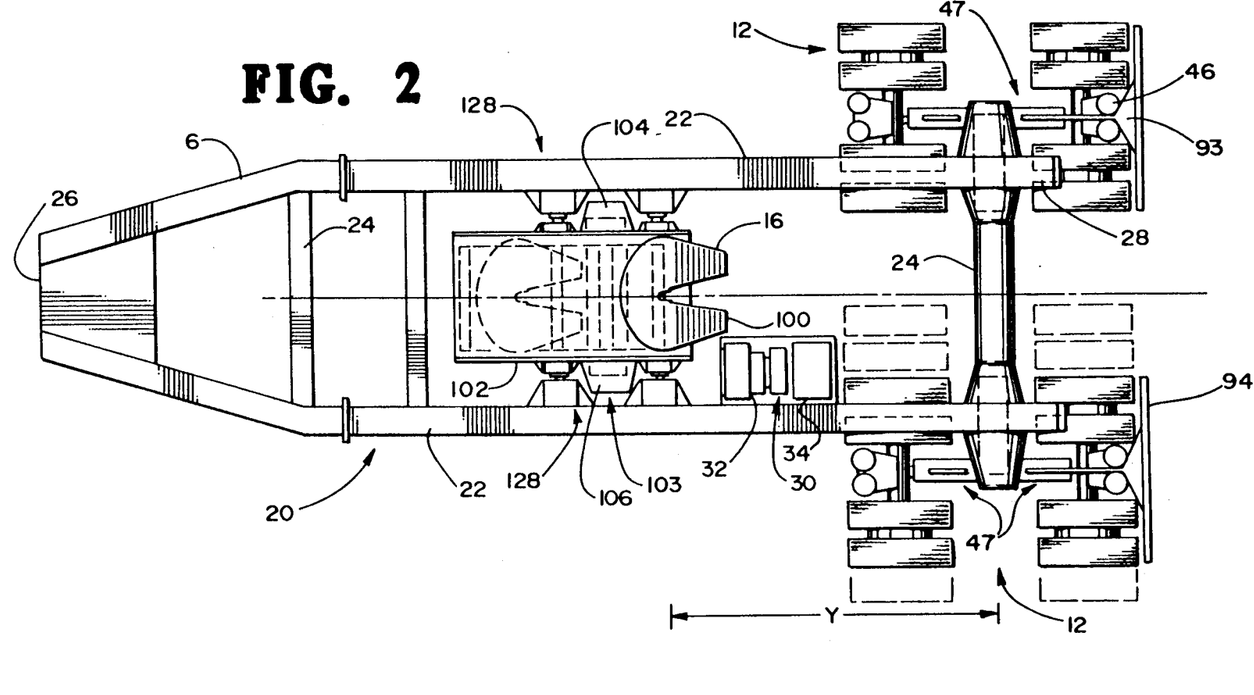
FIG. 2 is a top plan view of the jeep of the present invention.
Figure 3:
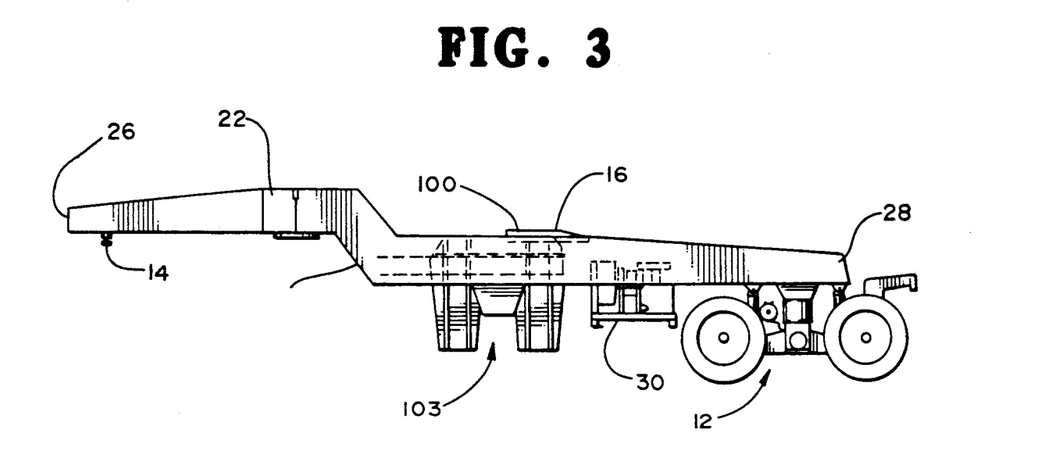
FIG. 3 is a side elevational view of the jeep.

FIGS. 2 and 3 show additional detail of the jeep 6 of the present invention. Longitudinal and transverse orientations of components are made with reference to the jeep 6 longitudinal axis A. The jeep 6 has a rigid frame 20 made up of longitudinal side beams 22 and lateral cross members 24. The front of the frame 20 is indicated at 26 and the frame 20 rear end is shown at 28. The rigid frame 20 is supported by a plurality of wheel/axle assemblies 12. Approximately midway between the front 26 and rear 28 ends, the frame 20 supports a fifth wheel 16 for connecting load unit 8 to the jeep 6. The frame 20 also supports a hydraulic pressure power unit 30 which includes engine 32 and reservoir 34. This power unit 30 is adapted to be in fluid communication with the various hydraulic features of the present invention as presented hereinbelow to provide operative hydraulic power thereto.

Figure 4:
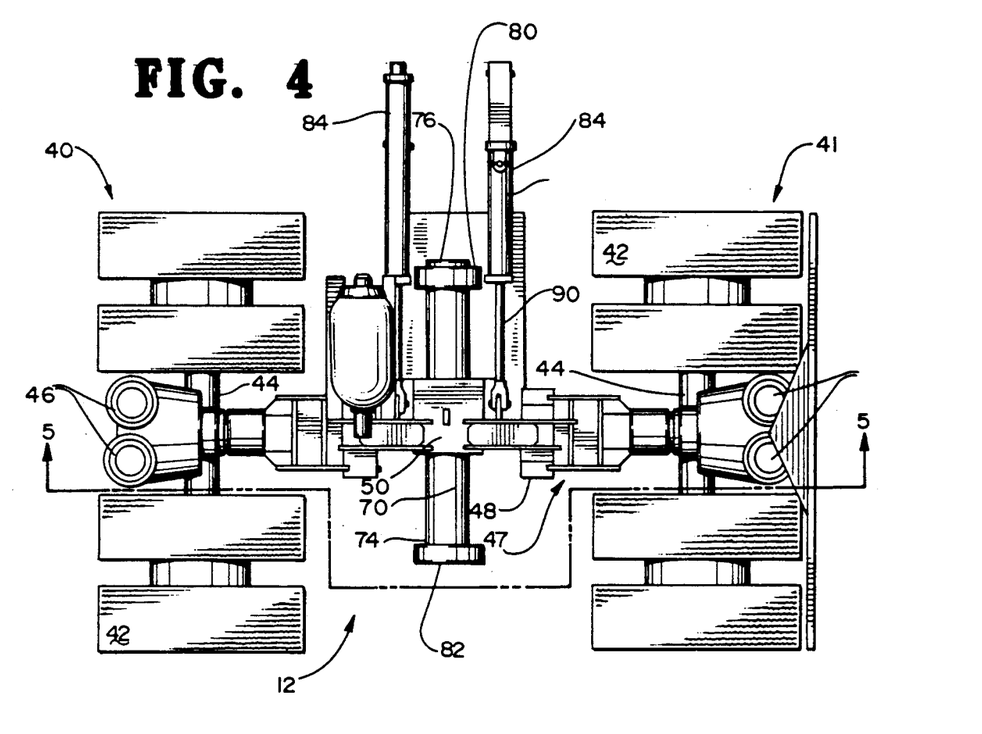
FIG. 4 is a top plan view of one wheel and axle assembly of the jeep and carriage of the present invention.
Figure 5:
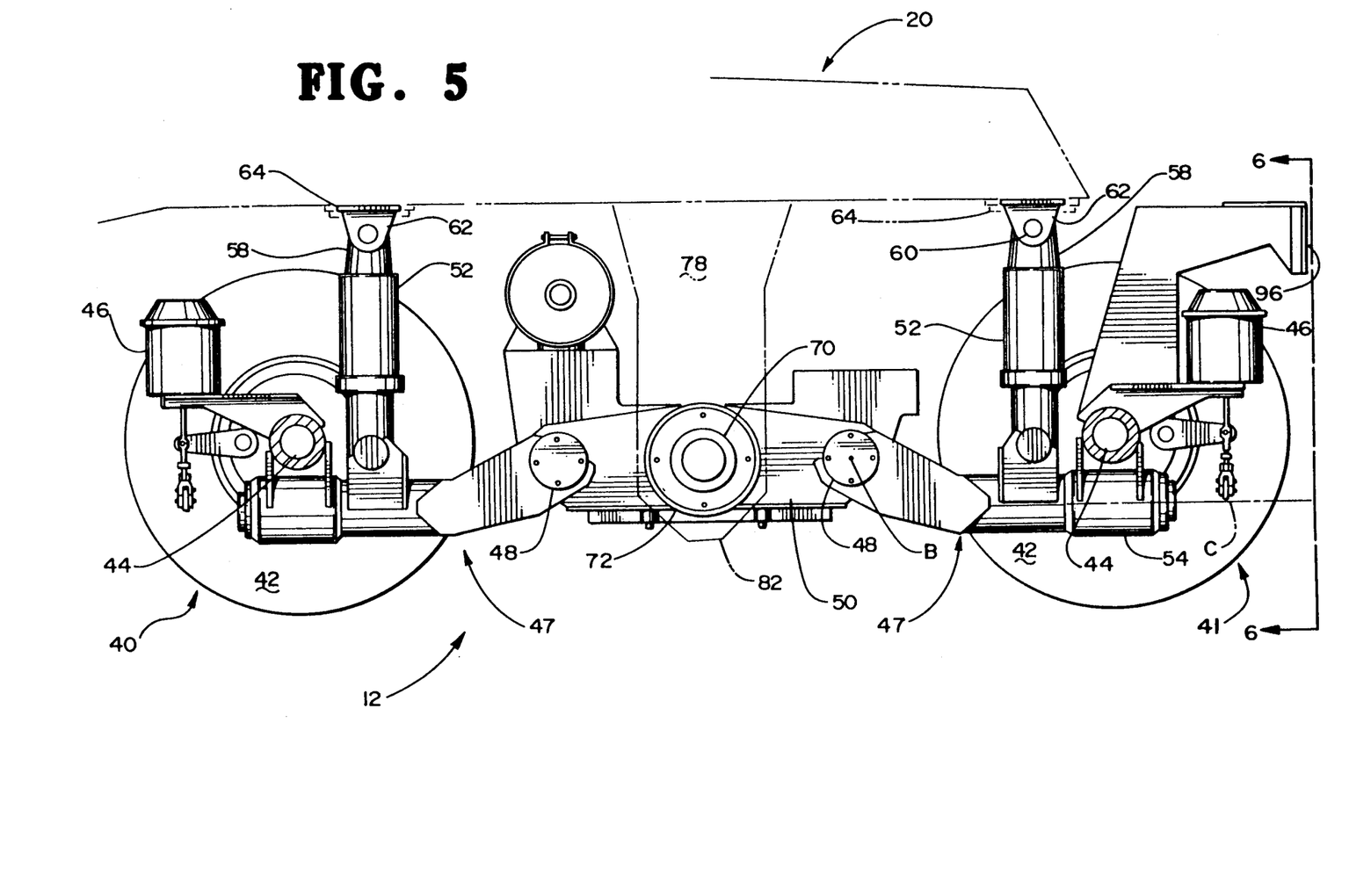
FIG. 5 is a cross-sectional view of the wheel and axle assembly taken along line 5—5 of FIG. 4.
Figure 6:
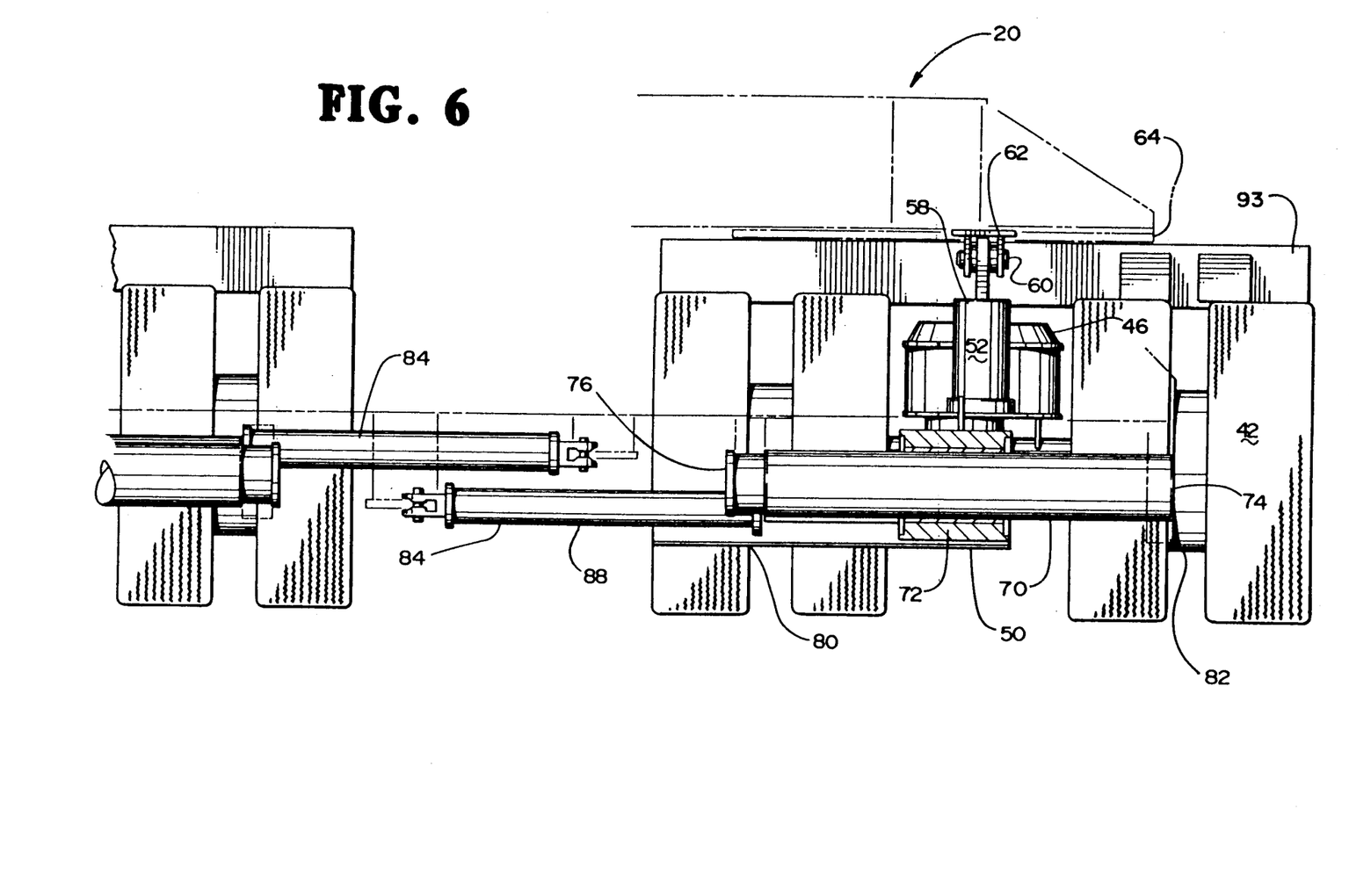
FIG. 6 is a partial elevational view of the wheel and axle assembly taken along line 6—6 in FIG. 5.

FIGS. 4, 5 and 6 show additional details of the jeep 6 of the present invention and specifically, the wheel/axle assemblies 12. Each wheel/axle assembly 12 is made up of two sets 40, 41 of four wheels 42 each. Each of the wheels is attached to a rigid secondary axle 44 and is provided with an air-actuated, drum brake system 46.

Each transversely extending secondary axle 44 is attached to a floating, longitudinally extending swing arm 47. The vertical float or responsiveness of this arm 47 is provided by a pivotable, bearing supported connection 48 to journal follower 50. Connection 48 permits pivotable movement about line B, shown in FIG. 5. The range of pivotal motion about connection 48 is dampened, controlled and adjusted by vertical hydraulic cylinder/piston arrangements 52. The cylinder/piston arrangements 52, one per front set of wheels 40 and one for the rear set 41, are attached to the swing arm 47 between connection 48 and secondary axle 44. The distal end of the arm 47 is adapted to provide a journal and bearing connection 54 to the secondary axle 44 and this connection allows and provides for the oscillation of the axle 44 about line C as shown in FIG. 5.

The upper end 58 of the hydraulic cylinder 52 is attached by a connector 60 to slider 62. Slider 62 is transversely movably attached to frame 20 by a slider bracket 64 on the underside of the frame 20. The bracket 64 may be continuous across the frame 20 (shown), it may be a plurality of discrete brackets or it may be a single bracket attachable to the frame 20 at a plurality of locations. Hydraulic arrangement 52 may be used to adjust the height and altitude of the load supported by the vehicle 2, as well as the softness or firmness of the ride. The slider bracket 64 is provided to accommodate the variable transverse positioning of the entire wheel/axle assembly 12 as will be explained more fully below.

Each wheel/axle assembly 12 is transversely, slidably mounted on the central shaft or main axle 70 by typical journal and bearing 72, which is mounted in journal follower 50. At each end 74, 76 the main axle 70 is fixedly mounted to the jeep frame 20 by a yoke 78 having an inboard bracket 80 and an outboard bracket 82. The follower 50 provides for the sliding movement of a wheel/axle assembly 12 along the length of the main axle 70 between the ends 74, 76 thereof. Additionally, the main axle 70 may be keyed or pinned (not shown) to prevent movement of the axle 70 while the wheel/axle assemblies 12 are being moved.

To transversely position the wheel/axle assemblies 12 between the fully extended width of fourteen feet and the standard width of ten feet measured between the outside assemblies, each wheel/axle assembly 12 has a pair of hydraulic positioning jacks 84 connected thereto and extending between frame 20 and the follower 50. The jacks 84 are made up of telescoping hydraulic cylinders 88 and pistons 90 and extend or contract to adjust the transverse width between the wheel/axle assemblies on either side of the jeep 6.

The rearmost wheel/axle assembly 12 is provided with a mud flap support 93, mud flaps 94 and lights 96; the flaps and lights move integrally with the wheel/axle assembly.

FIGS. 7-10 show additional details of the jeep 6 of the present invention, specifically, the adjustable fifth-wheel hitch 16 of the jeep 6. The hitch 16 includes a top plate 100 which is pivotally mounted about a transverse axis relative to the jeep frame 20. The top plate 100 is attached to a mounting plate 102 and may be moved longitudinally forward or backward relative to the mounting plate 102 as by a conventional slider mechanism (not shown).

Figure 8:
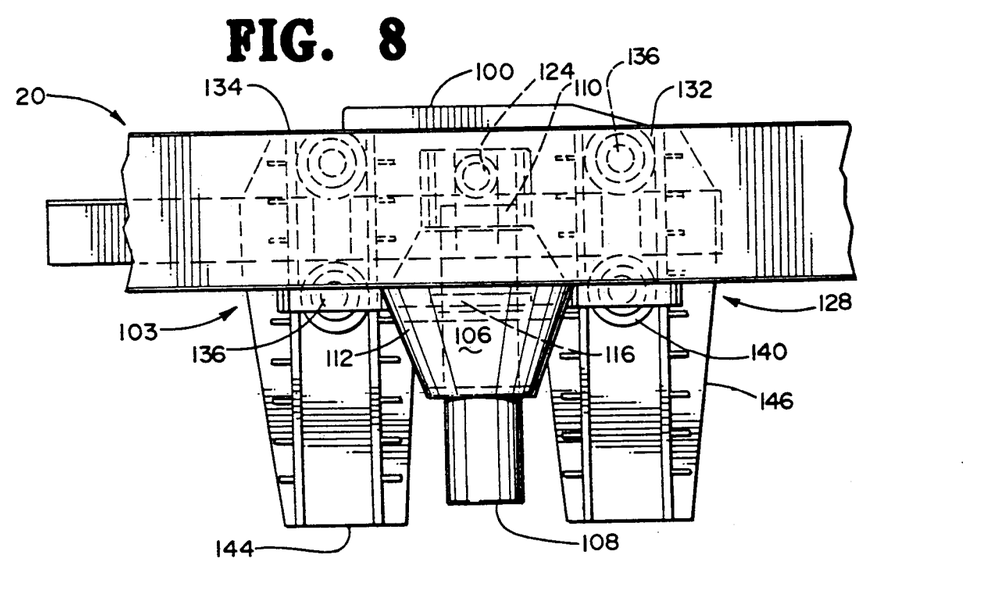
FIG. 8 is a side elevational view of the fifth-wheel elevator assembly.
Figures 9, 10:
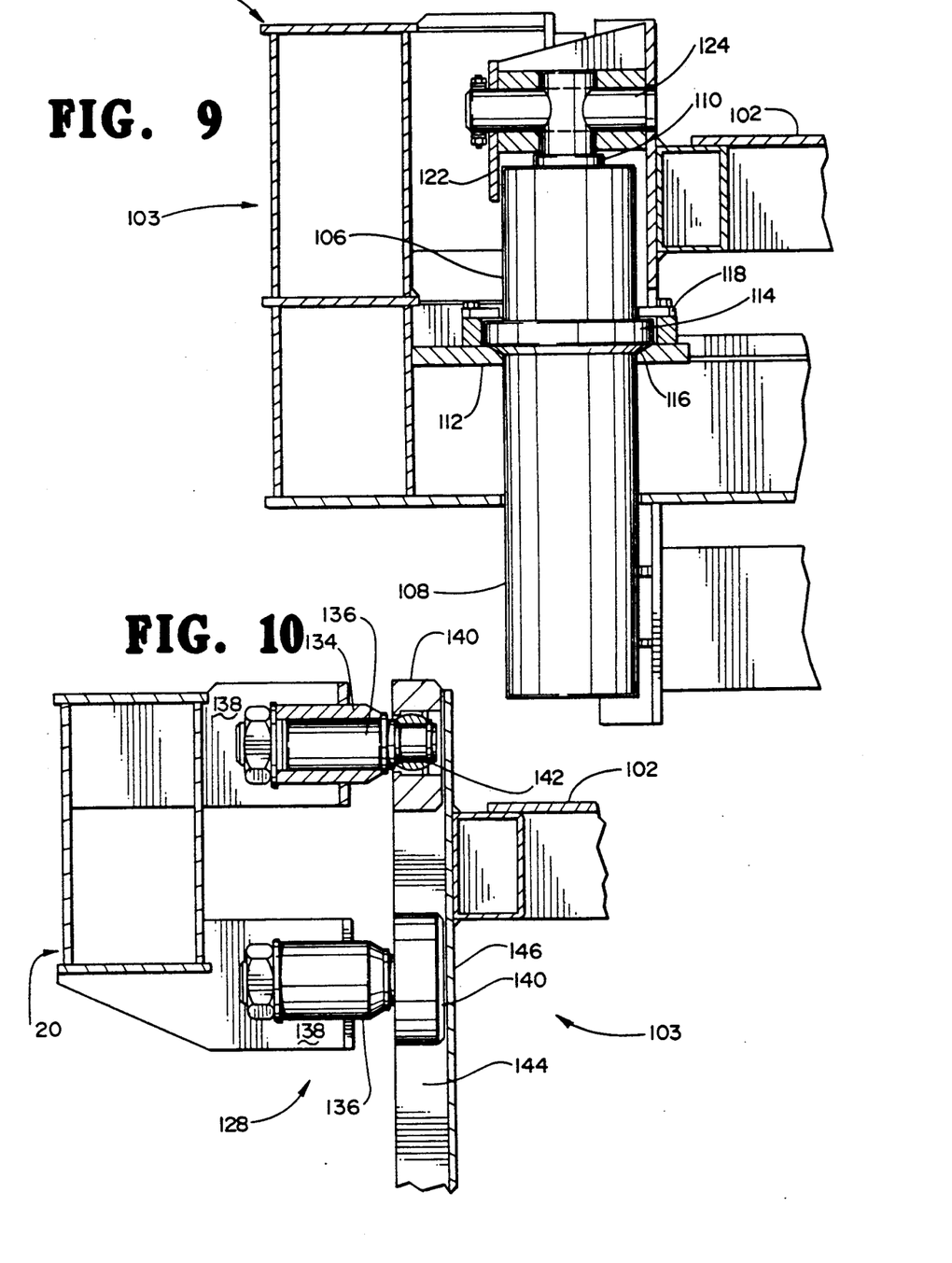
FIG. 9 is a partial sectional view elevator assembly, taken along line 9—9 of FIG. 7.
FIG. 10 is a partial sectional view taken along line 10—10 in FIG. 7.

The fifth wheel 16 is movable vertically relative to the jeep frame 20 by means of an elevator assembly 103 including a pair of hydraulic lifts 104, 106 (see FIG. 2) attached between the jeep frame 20 and the fifth-wheel mounting plate 102. FIGS. 8 and 9 show that a hydraulic lift 106 includes a hydraulic cylinder 108 and a ram 110. The cylinder 108 is attached to the frame 20 by a mount 112 supporting a mounting ring 114 having a spherical seat 116 and held in place by a toe flange 118. The spherical seat 116 is provided to allow response to loading so that the elevation assembly 103 will not be damaged.

The ram 110 is reciprocally received in the cylinder 108 and is attached at its upper end to the fifth-wheel mounting plate 102 by a journaled box plate 122. The box plate 122 and ram upper end are pinned by an elevator pin 124. When the ram 110 is extended, the mounting plate 102 and the fifth-wheel top plate 100 attached thereto will be raised vertically relative to the jeep frame 20. When the desired vertical position is achieved, the hitch 16 may be fixed at that level by a typical hydraulic check valve arrangement (not shown).

Figure 7:
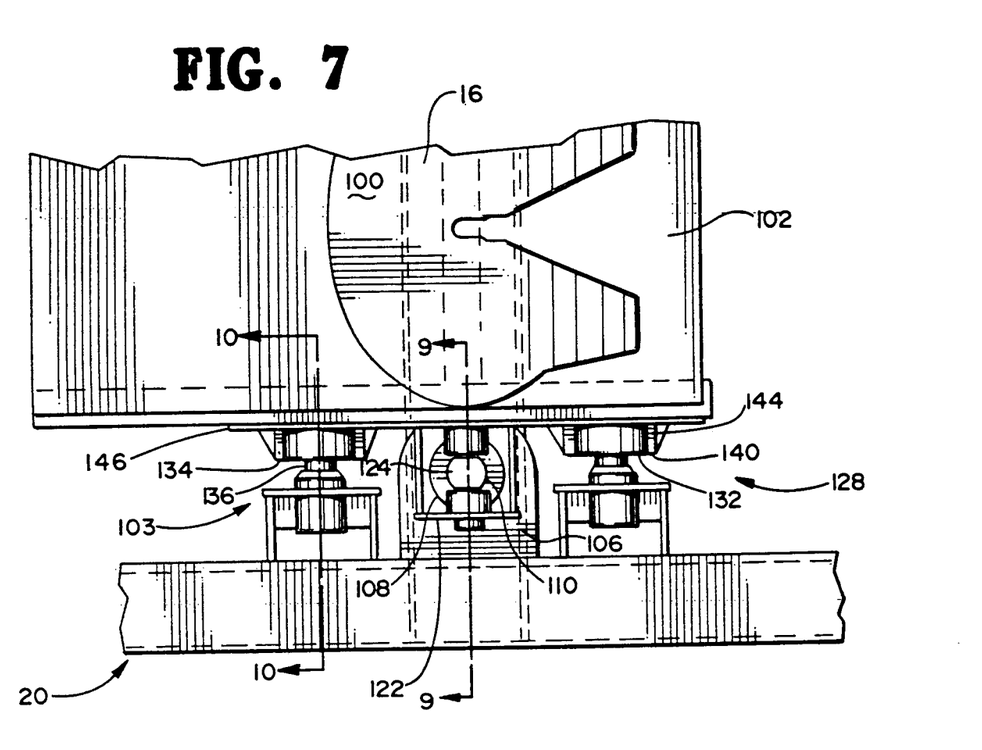
FIG. 7 is a top plan view of the fifth-wheel elevator assembly of the jeep of the present invention.

FIGS. 7, 8 and 10 show the roller guide mechanism sets 128 of the elevator assembly 103. Specifically, two identical sets 128 of two roller guides 132, 134 each ar®provided, one set on each side of the fifth wheel 16. The roller guides 132, 134 are located on each side of the elevator assembly 103. One end of each roller axle 136 is attached to the frame 20 by a roller mount 138. The roller wheels 140 (2 per roller guide 132, 134) are attached to the opposite end of each axle 136 by a typical ball-and-socket bearing 142. The wheels 140 are received in and guided by roller channels 144 which are fixed to a roller guides plate 146 attached to the fifth wheel mounting plate 102. The rollers guides 132, 134 provide for smooth up and down motion or vertical adjustment of the fifth wheel 16, but also handle moment loading on the fifth wheel 16 when a load is being transported by vehicle 2.

As previously stated, one of the objects of the present invention is to enable compliance with restrictions enacted by the various jurisdictions through which a load must pass. In accordance with this object and the present invention, the footprint of the jeep 6 can be changed. It is not beyond the scope of the present invention that the footprint of both the jeep and the rear carriage may be adjustable; the rear carriage may be provided with adjustable wheel/axle assemblies and a positionable fifth wheel.

Adding wheel/axle assemblies 12 to change a vehicle footprint along its length is known and, thereby, the per-axle or per-wheel loading may be reduced. When handling medium to massive loads, in the range of one-half million to one million pounds, this expediency is not sufficient. Applicants have discovered that, in accordance with the present invention, the width of the vehicle footprint may be easily and effectively changed thereby changing the load's relationship to the roadway surface. That is, individual wheel/axle assemblies 12 on opposite sides of the jeep 6 may be moved in or away from the longitudinal center of the jeep along main axle 70. Not only will this change the relationship to the road surface, but it will permit greater and adjustable lateral stability to minimize roll-over accidents and enable conformance to width restrictions in various jurisdictions.

Additional flexibility with regard to weight limitations or distribution in various jurisdictions is accomplished by providing the jeep 6 with the adjustable fifth wheel 16 described herein. The fifth wheel 16 is adapted to be moved in two orientations, vertical and horizontal, relative to the jeep frame 20. Thus, the fifth wheel 16 may be used in conjunction with the laterally adjustable wheel/axle assemblies 12 to enhance the load handling advantages provided by this invention.

The selectively positionable fifth wheel 16 and the laterally movable wheel/axle assemblies 12 together provide great flexibility. By way of example, the following illustrates how loading may be changed to meet jurisdictional requirements. Y, shown in FIG. 2, is the variable distance from the center of the axle 70 to the fifth-wheel hitch connection point 16:

| JURISDICTION | GROUP LOAD | TRACTOR | Y (inches) |
| --- | --- | --- | --- |
| New Mexico | 43,000 | 43,000 | 135 |
| California | 58,400 | 46,725 | 117 |
| California (14' width) | 75,000 | 46,725 | 99 |
| Off Road | 100,000 | 60,000 | 96 |

In use, the vehicle 2 may be assembled prior to or after a load is in place. In either situation, the load unit 8 rests on the ground or other support while a load is secured thereto. While unloaded, the wheel/axle assemblies 12 of the jeep 6 and the rear carriage 10 may be moved transversely to a selected width by jacks 24. The load unit 8 may then be raised by vertically raising the fifth-wheel hitches 16, 18 until the desired load unit 8 ground clearance is achieved and the load is transferred to wheel/axle assemblies 12.

During transit, the distribution of the load on the jeep 6 may be moved forwardly or rearwardly without unloading the vehicle 2 by moving the fifth-wheel hitch 16 horizontally forwardly or rearwardly (FIG. 2) whereby the distribution of loading on the front jeep 6 can be adjusted to reach the desired distribution between the tractor and jeep. The vehicle footprint may be changed by lowering the fifth-wheel hitches 16, 18 until the load has been removed from the wheel/axle assemblies 12 (that is, until the load unit 8 is resting on the ground or other support) and then the hydraulic jacks 84 are used to move the wheel/axle assemblies 12 to a selected width. The hitches 16, 18 then may be raised to lift the load and transport may proceed.

The present invention may be embodied in other specific forms without departing from the spirit or essential attributes thereof and, therefore, the present embodiment should be considered as illustrative and not restrictive. Reference should be made to the appended claims rather than to the foregoing description to indicate the scope of the invention.

What is claimed:

1. A jeep for use with a vehicle for hauling heavy loads, said vehicle including at least one power supplying unit, at least one jeep, a least one rear carriage and a load unit supported by said jeep and carriage units, said jeep comprising:
   (a) an elongated, rigid frame having a top surface and an underside and a front leading end and a rear trailing end, said frame extending therebetween;
   (b) a plurality of hydraulically suspended wheel/axle assemblies attached to said underside of said frame near the opposite longitudinal sides thereof, and means for selectively and transversely positioning said wheel/axle assemblies along a line extending transversely and perpendicularly across the longitudinal axis of said elongated frame;
   (c) a fifth-wheel connection member attached to the underside of and near the leading end of said frame; and
   (d) a fifth-wheel plate attached to the top surface of said frame, said plate located rearwardly from said fifth-wheel connection member, and means for selectively positioning said plate in the vertical orientation and in the horizontal, longitudinal orientation relative to said frame, said means for selectively positioning in the vertical direction comprising a hydraulically-powered elevator assembly having two pairs of piston and cylinder arrangements, one of said arrangements located on each side of said fifth-wheel plate, said cylinders being fixedly attached to said frame, and said pistons being operably attached to said fifth-wheel plate.

2. The jeep of claim 1, wherein said wheel/axle assemblies are provided with hydraulic jack means connected between said assemblies and said frame for selectively adjusting the position of said wheel/axle assemblies relative to said frame.

3. The jeep of claim 1, wherein said elevator assembly is provided with a roller guide, comprising a plurality of rollers attached to said frame, said rollers adapted to rotate in a plurality of channels attached to said fifth-wheel plate, thereby providing the smooth vertical adjustment of said fifth-wheel plate and absorbing moment loading at said fifth-wheel plate.

4. An adjustable wheel/axle assembly for use under an elongated jeep or carriage unit which is a component of a vehicle used for transporting heavy loads, said wheel/axle assembly comprising:

(a) a central shaft attached under said jeep in a fixed position and spaced from the underside of the jeep, said shaft extending parallel to the underside of the jeep and perpendicularly relative to the central longitudinal axis of said jeep;

(b) in-line forwardly and rearwardly extending swing arms having two ends, said arms rotatably and slidably attached to said central shaft at a first end thereof;

(c) a pair of parallel, spaced rigid axles, one of said axles spaced forwardly of said central shaft and the second of said axles spaced rearwardly of said central shaft, said axles attached to the second ends of said swing arms;

(d) a plurality of ground-contacting wheels arranged in four sets of two wheels in each set, said four sets attached to said front and rear rigid axles, one set of said wheel attached to said rigid axles on opposite sides of said swing arms; and (e) a hydraulic suspension means comprising hydraulic cylinders and pistons, each having a lower end attached to a swing arm and an upper end slidably attached to the underside of said jeep.

5. The hydraulic suspension means of claim 4, wherein said upper end of said means is pinned to a sliding member having a general planar upper surface, which member is received in a slide bracket fixedly attached to the underside of said frame.

6. The wheel/axle assembly of claim 4, wherein said sets of wheels, rigid axles and swing arms are in generally and relatively fixed relationship, and are movable laterally as a unitary subassembly relative to said central shaft.

7. The wheel/axle assembly of claim 6, wherein said wheel/axle assemblies are provided with hydraulic ram means for actuating and controlling the lateral movement thereof.

* * * * *